(12) United States Patent
Yahagi

(10) Patent No.: US 6,278,559 B1
(45) Date of Patent: Aug. 21, 2001

(54) ZOOM LENS FOR TELEVISION CAMERA

(75) Inventor: Satoshi Yahagi, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/520,142

(22) Filed: Mar. 7, 2000

(30) Foreign Application Priority Data

Mar. 12, 1999 (JP) .................................................. 11-066185

(51) Int. Cl.$^7$ ........................... G02B 15/14; G02B 13/18; G02B 9/60
(52) U.S. Cl. ........................... 359/683; 359/676; 359/684; 359/685; 359/686; 359/714; 359/765
(58) Field of Search ........................... 359/676, 683–688, 359/714, 708, 765

(56) References Cited

U.S. PATENT DOCUMENTS

| | | | |
|---|---|---|---|
| 3,598,476 | * 8/1971 | Merigold et al. | 359/684 |
| 4,874,231 | * 10/1989 | Aono | 359/684 |
| 5,666,230 | * 9/1997 | Tatsuno | 359/684 |
| 5,677,792 | * 10/1997 | Hamano | 359/557 |
| 5,808,809 | * 9/1998 | Yahagi | 359/683 |
| 5,856,885 | * 1/1999 | Yamamoto | 359/684 |
| 5,898,525 | * 4/1999 | Suzuki | 359/684 |
| 5,986,820 | * 11/1999 | Usui et al. | 359/684 |
| 5,995,296 | * 11/1999 | Usui | 359/684 |
| 6,002,527 | * 12/1999 | Ohtake | 359/683 |
| 6,055,114 | * 4/2000 | Ohtake | 359/676 |

FOREIGN PATENT DOCUMENTS

| | | | |
|---|---|---|---|
| 61-39016 | * 2/1986 | (JP) | 359/765 |
| 10-31157 | 2/1998 | (JP) . | |

\* cited by examiner

*Primary Examiner*—Evelyn A Lester
(74) *Attorney, Agent, or Firm*—Arnold International; Bruce Y. Arnold

(57) ABSTRACT

A zoom lens having only five lens groups of positive, negative, negative, positive and positive refractive power, respectively, in order from the object side. The focal distance is varied by shifting the second and third lens groups, in order from the object side, along the optical axis, and a middle sub-assembly in the first lens group is shifted along the optical axis in order to correct for what otherwise would be a shifting in the image plane as the distance to the object is varied. The first lens group is formed of three sub-assemblies, with the sub-assembly nearest the object side having negative refractive power and being fixed in position, the middle sub-assembly having positive refractive power and shifting as discussed above, and the sub-assembly nearest the image-side having positive refractive power and being fixed in position. The second lens group, in order from the object side, is formed of two sub-assemblies having negative and positive refractive power, respectively, and the spacing between these two sub-assemblies is varied with a change in focal distance in order to correct for aberrations. Preferably, one or more lens element surfaces in the second lens group is aspherical.

3 Claims, 8 Drawing Sheets

EMBODIMENT 1

WIDE-ANGLE END

SPHERICAL ABERRATION

ASTIGMATISM

DISTORTION

TELEPHOTO END

SPHERICAL ABERRATION

ASTIGMATISM

DISTORTION

EMBODIMENT 2

WIDE-ANGLE END

F / 2.23
— d
--- g
-0.25    0.25 mm
SPHERICAL ABERRATION

ω = 37.9°
— S
--- T
-0.25    0.25 mm
ASTIGMATISM

ω = 37.9°
-3%    3%
DISTORTION

TELEPHOTO END

F / 2.84
— d
--- g
-0.25    0.25 mm
SPHERICAL ABERRATION

ω = 1.9°
— S
--- T
-0.25    0.25 mm
ASTIGMATISM

ω = 1.9°
-3%    3%
DISTORTION

EMBODIMENT 3

WIDE-ANGLE END

F / 2.26
—— d
---- g
-0.25    0.25 mm
SPHERICAL ABERRATION

ω = 37.8°
—— S
---- T
-0.25    0.25 mm
ASTIGMATISM

ω = 37.8°
-3%    3%
DISTORTION

TELEPHOTO END

F / 2.82
—— d
---- g
-0.25    0.25 mm
SPHERICAL ABERRATION

ω = 1.8°
—— S
---- T
-0.25    0.25 mm
ASTIGMATISM

ω = 1.8°
-3%    3%
DISTORTION

ZOOM LENS FOR TELEVISION CAMERA

BACKGROUND OF THE INVENTION

A compact and lightweight zoom lens with high performance has been increasingly required for broadcasting and business purposes. Since high definition television broadcasting is about to proliferate, there is an urgent need for a zoom lens of practical size and weight which has high performance characteristics. Conventional zoom lenses often have many lens elements in order to attain a high performance, so they tend to be large and heavy. It has been difficult for these prior art lenses to maintain high performance imaging over the entire range of zoom from the wide-angle end to the telephoto end, while simultaneously allowing the subject distance to range from nearby to infinity. Thus, there is a need for a zoom lens which solves these two problems, while simultaneously providing a compact and lightweight zoom lens.

The assignee of the present invention has previously disclosed a zoom lens in Japanese Laid Open Patent Application H10-31157 in order to resolve these problems. However, a more lightweight and compact zoom lens is now required.

BRIEF SUMMARY OF THE INVENTION

This invention concerns a zoom lens, for use especially in television cameras for broadcasting or business purposes, where high performance is required. A first object of the present invention is to minimize the shift in image surface when the focal length is varied from the wide-angle to the telephoto end. A second object of the invention is to minimize the shift in image surface when the object is moved from the near to far position of focus. A third object of the invention is to provide a compact zoom lens. A fourth object of the invention is to provide a lightweight zoom lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The zoom lens of the present invention includes, in sequential order from the lens group nearest the object, a first lens group G1 having positive refractive power, a second lens group G2 having negative refractive power, a third lens group G3 having negative refractive power, a fourth lens group G4 having positive refractive power, and a fifth lens group G5 having positive refractive power. The focal distance of the zoom lens is changed by shifting the second lens group G2 and the third lens group G3 along the optical axis.

The zoom lens of the present invention is characterized by the following:

Lens group G1 includes sub-assemblies 1A, F1 and 1B respectively; with sub-assembly 1A being on the object-side. Sub-assembly 1A is fixed in position and is of negative refractive power, sub-assembly F1 is of positive refractive power and is shifted along the optical axis in order to correct a shift of the image surface that would otherwise occur during zooming. Sub-assembly 1B is of overall positive refractive power and is stationary in position, but includes at least one lens element of positive refractive power and at least one lens element of negative refractive power.

The second lens group G2 includes sub-assemblies 2A and 2B, in sequential order from the object side. Sub-assembly 2A is of negative refractive power, and sub-assembly 2B is of positive refractive power, and the distance between sub-assemblies 2A and 2B is changed in order to correct for image surface shifts which would otherwise occur as a result of zooming. One or more surfaces of lens group G2 are aspherical. Further, it is preferred that the aspherical surface (or surfaces) be in sub-assemblies 2A and 2B.

Figure 1:
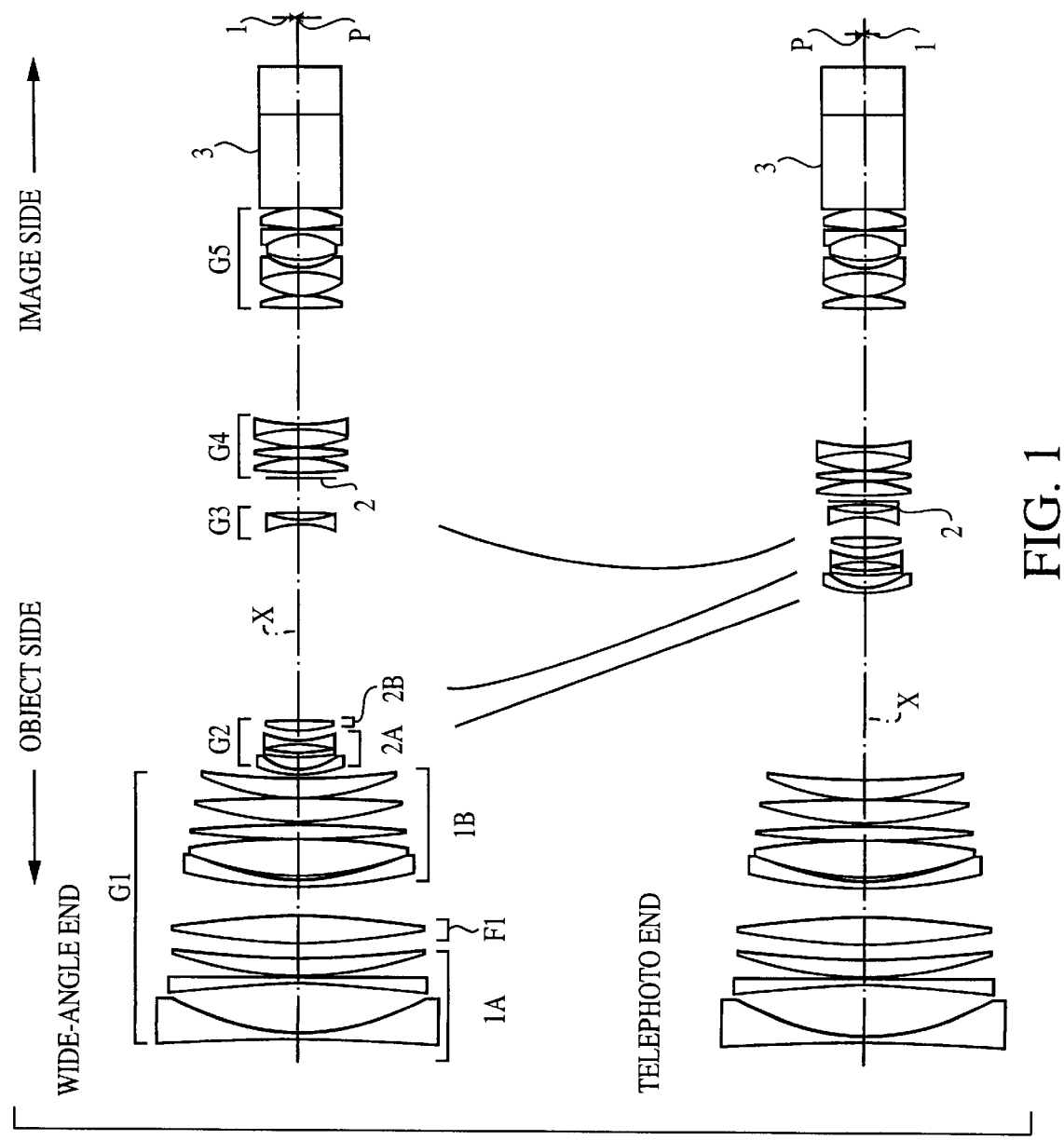
FIG. 1 shows the basic lens element configuration and lens groups at the wide-angle end and the telephoto end of the zoom lens of the present invention.
Figure 2:
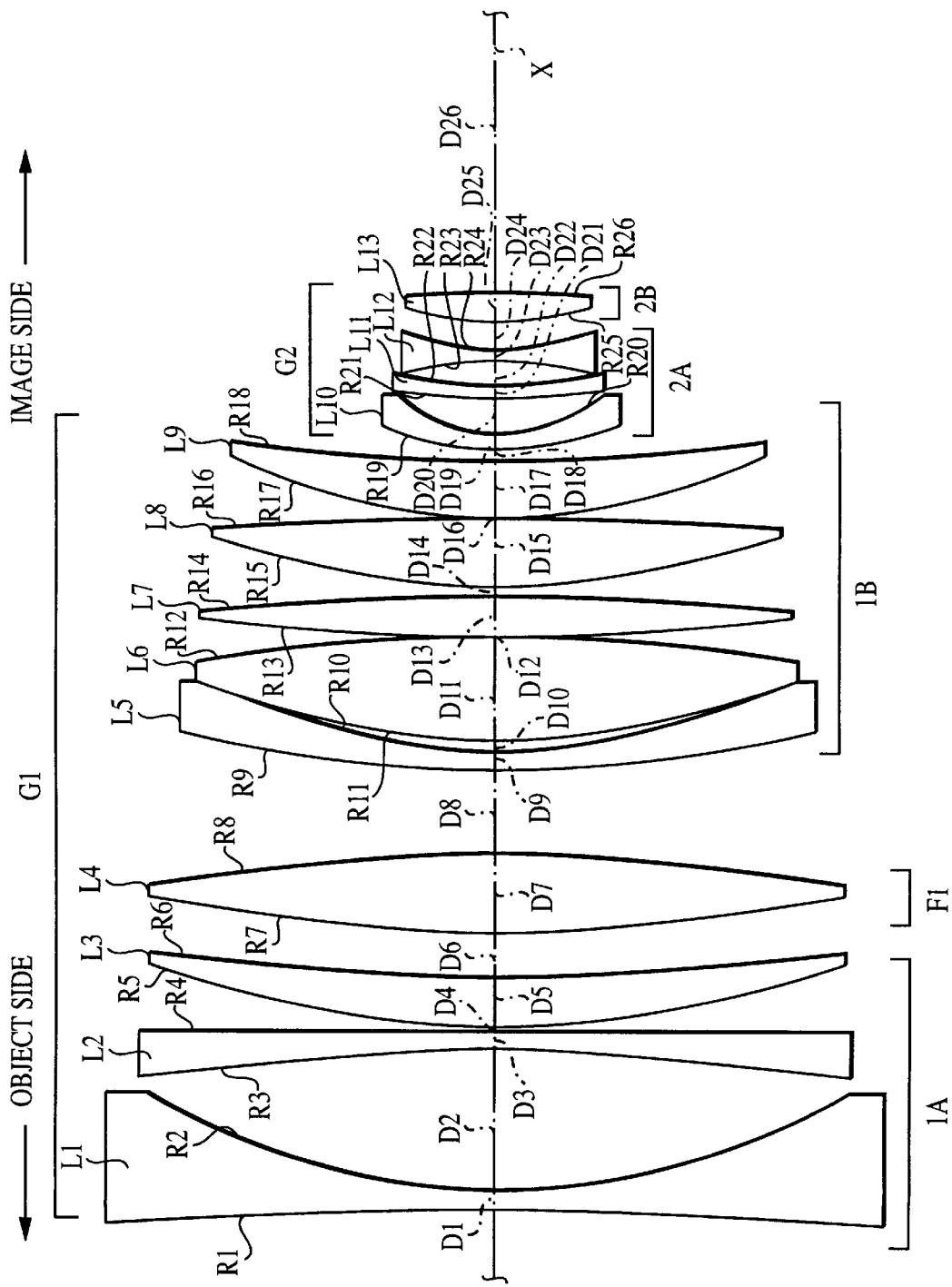
FIG. 2 is an enlarged view of a portion of FIG. 1, and shows the basic lens element configuration of the first lens group and the second lens group at the wide-angle end of the zoom lens.
Figure 3:
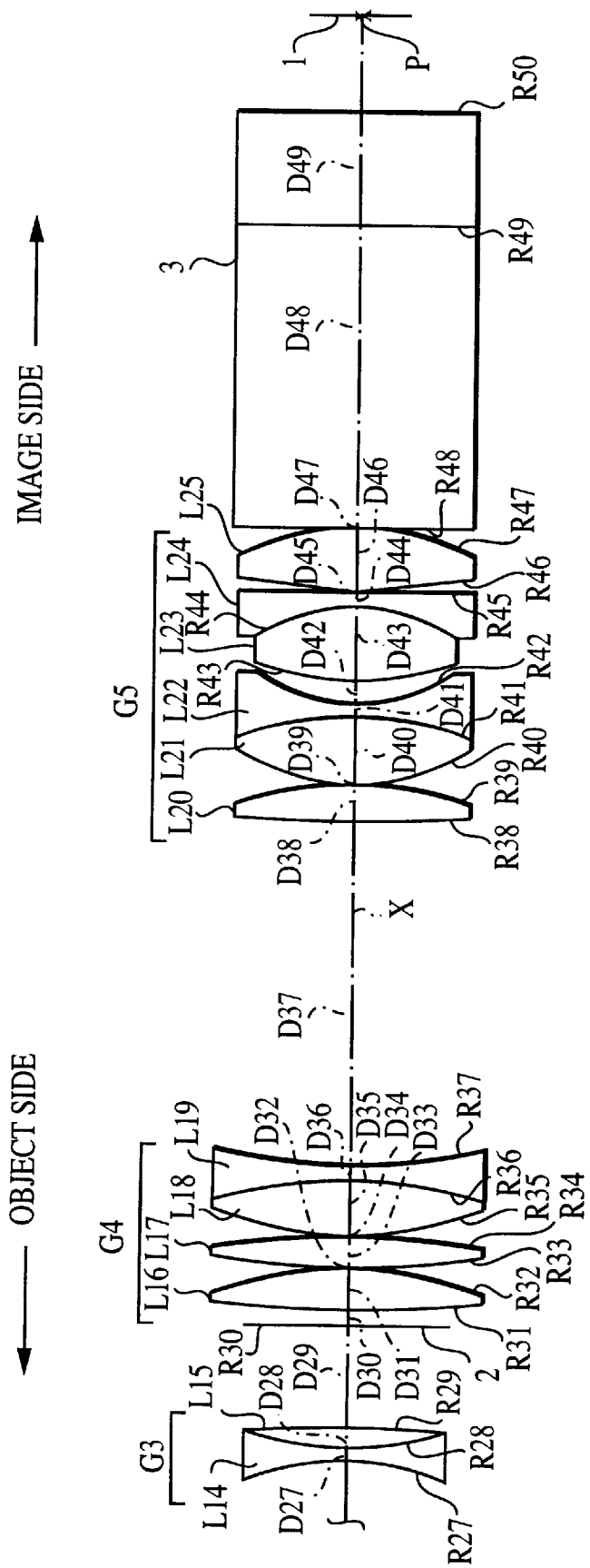
FIG. 3 is an enlarged view of a portion of FIG. 1, and shows the basic lens element configuration from the third lens group to the image plane at the wide-angle end of the zoom lens.

The zoom lens of the invention will now be explained in detail, with reference to the drawings. FIG. 1 shows the relationship among the lens groups at both the wide-angle end and telephoto end. The three curved lines indicated in the middle of FIG. 1 show the movement track from the wide-angle end to the telephoto end of the sub-assemblies 2A, 2B (of lens group G2) and the lens group G3, respectively. FIGS. 2 and 3 are enlarged views of portions of FIG. 1, and illustrate the lens element configuration of the zoom lens at the wide-angle end, with FIG. 2 showing lens groups G1 and G2, and FIG. 3 showing lens groups G3, G4 and G5. Light which is incident from the object side along the optical axis X, is imaged at the imaging point P of the solid-state image-sensing device 1. A stop 2 is incorporated between the third lens group G3 and fourth lens group G4. The zoom lens may include a low-pass filter 3 and/or other optical components, which may be incorporated in the light path subsequent to lens group G5.

In general, a zoom lens with high magnification enlarges the aberrations generated at the telephoto end. When correcting this phenomenon, the correction tends to cause distortion in the middle of the range of zoom, if the correction is accomplished by modifying the astigmatism at the wide-angle end. Further, it becomes difficult to maintain a balance between the curvature of field and spherical aberration, thus lowering the modulation transfer function in the middle of the range of zoom.

However, in the above-mentioned design, because the second lens group G2 provides the greatest refractive power, the aberrations of the zoom lens are highly sensitive to the positioning of this lens group. A zoom lens that enables the above-mentioned aberrations to be well-balanced results in a high quality image. In order for the zoom lens to correct for aberrations accurately and effectively, one or more of the lens surfaces of lens group G2 is made to have an aspherical shape. Tile height and incident angle of rays on surfaces of the second lens group G2 change greatly when zooming. Because of this, there is a negative influence upon optical performance at each focal distance. Astigmatism is especially troublesome in this lens group. Thus, compared to the use of aspherical surfaces elsewhere, the use of aspherical elements in lens group G2 is particularly helpful in order to reduce aberrations and the number of surfaces required for a given optical performance. By using one or more aspherical elements in the lens group G2, astigmatism can be favorably corrected over the entire range of zoom, thus enabling the zoom lens to have a high performance. This enables the movement amount of the lens elements that move during zooming to be reduced, thereby allowing for miniaturization of the zoom lens. Thus the use of aspherical surfaces in the second lens group G2 enables the zoom lens to be lightweight and compact without sacrificing performance. The use of an aspherical surface is especially desirable in sub-assembly 2B. The shape of an aspherical surface is given by Equation 1 below.

$$Z = CY^2/[(1+(1-KC^2Y^2)^{0.5}] + A_4Y^4 + A_6Y^6 + A_8Y^8 + A_{10}Y^{10} \quad \text{Equation (1)}$$

where

Z is the length (in mm) of a line drawn from a point on the aspherical surface at distance Y from the optical axis to the tangential plane of the aspherical surface vertex, Y is the distance from optical axis, K is the eccentricity, C is the curvature (1/R) of the aspherical surface near the optical axis, and $A_4$, $A_6$, $A_8$, $A_{10}$ are coefficients.

In addition, the above-mentioned lens group G1 includes sub-assembly 1A, which is located nearest the object-side, is fixed, and has a positive refractive power. Lens group G1 also includes the sub-assembly F1 which shifts along the optical axis to prevent the image surface from shifting during zooming. This design reduces the need to enlarge the lens element of sub-assembly 1A that is nearest the object side. Thus, the high performance of the lens is not reduced when zooming.

Finally, by fixing sub-assembly 1A, which is the sub-assembly nearest the object side, certain limits upon the overall length of the zoom lens, are maintained. As a result, the first lens element of the zoom lens in order from the object side does not need to be enlarged, and thus the zoom lens can be both compact and lightweight.

Three embodiments of the zoom lens of the present invention will now be explained in detail.

Embodiment 1

Table 1 lists the surface number # in order from the object side, the radius of curvature R (In mm) near the optical axis of each lens element surface, the on-axis surface spacing D, as well as the index of refraction $N_d$ and the Abbe value $v_d$ (at the sodium d-line) for each lens element. The surface indicated with a * to the right of the surface number # is aspherical.

TABLE 1

| # | R | D | $N_d$ | $v_d$ |
|---|---|---|---|---|
| 1 | −3936.402 | 2.10 | 1.77250 | 49.6 |
| 2 | 82.257 | 18.51 | | |
| 3 | −251.615 | 1.90 | 1.77250 | 49.6 |
| 4 | 322.861 | 1.00 | | |
| 5 | 130.570 | 7.41 | 1.84665 | 23.8 |
| 6 | 871.328 | 1.48 | | |
| 7 | 344.838 | 7.20 | 1.43387 | 95.1 |
| 8 | −260.791 | 18.49 | | |
| 9 | 304.877 | 2.00 | 1.84665 | 23.8 |
| 10 | 92.623 | 0.42 | | |
| 11 | 96.945 | 13.75 | 1.59240 | 68.3 |
| 12 | −227.899 | 0.20 | | |
| 13 | 154.413 | 7.56 | 1.43387 | 95.1 |
| 14 | −875.358 | 0.20 | | |
| 15 | 119.058 | 8.56 | 1.43387 | 95.1 |
| 16 | ∞ | 0.20 | | |
| 17 | 79.681 | 6.73 | 1.59240 | 68.3 |
| 18 | 190.688 | D18 (variable) | | |
| 19 | 38.708 | 1.20 | 1.81600 | 46.6 |
| 20 | 18.029 | 3.47 | | |
| 21 | 74.369 | 1.94 | 1.81600 | 46.6 |
| 22 | 38.883 | 3.28 | | |
| 23 | −43.626 | 1.20 | 1.81600 | 46.6 |
| 24 | 26.627 | D24 (variable) | | |
| 25* | 36.468 | 3.63 | 1.84665 | 23.8 |
| 26 | −469.930 | D26 (variable) | | |
| 27 | −29.956 | 1.00 | 1.77250 | 49.6 |
| 28 | 49.803 | 2.54 | 1.80517 | 25.4 |
| 29 | −159.775 | D29 (variable) | | |
| 30 | ∞ (stop) | 2.16 | | |
| 31 | 119.977 | 4.61 | 1.53171 | 48.8 |
| 32 | −39.653 | 0.20 | | |
| 33 | 58.391 | 3.47 | 1.51680 | 64.2 |
| 34 | −242.029 | 0.30 | | |
| 35 | 42.108 | 6.14 | 1.49700 | 81.5 |
| 36 | −42.108 | 1.70 | 1.79951 | 42.2 |
| 37 | 51.868 | 38.99 | | |
| 38 | 124.509 | 4.06 | 1.51454 | 54.6 |
| 39 | −46.554 | 0.30 | | |
| 40 | 24.337 | 7.13 | 1.48749 | 70.2 |
| 41 | −48.082 | 1.50 | 1.83480 | 42.7 |
| 42 | 18.653 | 3.57 | | |
| 43 | 29.566 | 7.56 | 1.51680 | 64.2 |
| 44 | −21.885 | 1.50 | 1.81600 | 46.6 |
| 45 | 303.100 | 0.15 | | |
| 46 | 52.619 | 7.25 | 1.51741 | 52.4 |
| 47 | −24.197 | 1.00 | | |

TABLE 1-continued

| # | R | D | $N_d$ | $v_d$ |
|---|---|---|---|---|
| 48 | ∞ | 33.00 | 1.60859 | 46.4 |
| 49 | ∞ | 13.20 | 1.51633 | 64.0 |
| 50 | ∞ | | | |

Table 2, below, lists the lens group spacings D18, D24, D26, and D29 at the wide-angle end, a mid-position and at the telephoto end. In addition, the focal distance f, the f number $F_{NO}$, and the image angle 2ω are listed for this embodiment.

TABLE 2

| | WIDE | MIDDLE | TELE |
|---|---|---|---|
| D18 | 1.63 | 47.53 | 69.23 |
| D24 | 3.38 | 3.29 | 3.06 |
| D26 | 67.40 | 15.58 | 7.26 |
| D29 | 9.10 | 15.11 | 1.96 | f = 7.61–148.0
$F_{NO}$ = 2.30–2.83
Image angle 2ω = 3.6°–75.8°

In this embodiment, the object side of lens element L13, which forms part of the sub-assembly 2B of the second lens group, is aspherical. The aspheric surface is defined by equation (1) above, with the constants as given in Table 3 below.

TABLE 3

| # | C | K | $A_4$ | $A_6$ | $A_8$ | $A_{10}$ |
|---|---|---|---|---|---|---|
| 25 | 0.0308 | 0.9962946 | $-0.2641611 \times 10^{-5}$ | $-0.7798748 \times 10^{-9}$ | $-0.9115991 \times 10^{-11}$ | $-0.9674797 \times 10^{-14}$ |

Embodiment 2

Table 4 below lists the surface number # in order from the object side, the radius of curvature R (in mm) near the optical axis of each lens element surface, the on-axis surface spacing D, as well as the index of refraction $N_d$ and the Abbe value $v_d$ (at the sodium d-line) for each lens element. The surface indicated by a * to the right of the surface number # is aspherical.

TABLE 4

| # | R | D | $N_d$ | $v_d$ |
|---|---|---|---|---|
| 1 | −1809.294 | 2.10 | 1.77250 | 49.6 |
| 2 | 83.816 | 18.39 | | |
| 3 | −250.298 | 1.90 | 1.77250 | 49.6 |
| 4 | 306.780 | 1.00 | | |
| 5 | 132.138 | 7.68 | 1.84665 | 23.8 |
| 6 | 1046.830 | 1.48 | | |
| 7 | 369.891 | 7.22 | 1.43387 | 95.1 |
| 8 | −258.246 | 18.49 | | |
| 9 | 332.820 | 2.00 | 1.84665 | 23.8 |
| 10 | 94.838 | 0.43 | | |
| 11 | 99.484 | 13.72 | 1.59240 | 68.3 |
| 12 | −215.699 | 0.20 | | |
| 13 | 149.825 | 7.81 | 1.43387 | 95.1 |
| 14 | −814.264 | 0.20 | | |
| 15 | 115.872 | 8.77 | 1.43387 | 95.1 |
| 16 | ∞ | 0.20 | | |

TABLE 4-continued

| # | R | D | $N_d$ | $v_d$ |
|---|---|---|---|---|
| 17 | 77.695 | 6.77 | 1.59240 | 68.3 |
| 18 | 179.620 | D18 (variable) | | |
| 19* | 42.017 | 1.20 | 1.81600 | 46.6 |
| 20 | 17.881 | 4.13 | | |
| 21 | 61.266 | 1.94 | 1.81600 | 46.6 |
| 22 | 45.342 | 3.09 | | |
| 23 | −43.656 | 1.20 | 1.81600 | 46.6 |
| 24 | 25.625 | D24 (variable) | | |
| 25 | 34.163 | 3.59 | 1.84665 | 23.8 |
| 26 | −404.832 | D26 (variable) | | |
| 27 | −28.307 | 1.00 | 1.77250 | 49.6 |
| 28 | 48.469 | 2.58 | 1.80517 | 25.4 |
| 29 | −152.308 | D29 (variable) | | |
| 30 | ∞ (stop) | 2.16 | | |
| 31 | 111.736 | 4.61 | 1.53171 | 48.8 |
| 32 | −40.626 | 0.20 | | |
| 33 | 57.672 | 3.55 | 1.51680 | 64.2 |
| 34 | −216.440 | 0.30 | | |
| 35 | 42.466 | 6.25 | 1.49700 | 81.5 |
| 36 | −42.466 | 1.70 | 1.79951 | 42.2 |
| 37 | 51.154 | 1.00 | | |
| 38 | 116.219 | 4.04 | 1.51454 | 54.6 |
| 39 | −48.925 | 0.30 | | |
| 40 | 24.189 | 7.19 | 1.48749 | 70.2 |
| 41 | −48.915 | 1.50 | 1.83480 | 42.7 |
| 42 | 18.399 | 3.09 | | |
| 43 | 29.567 | 7.58 | 1.51680 | 64.2 |
| 44 | −21.373 | 1.50 | 1.81600 | 46.6 |
| 45 | 273.771 | 0.15 | | |
| 46 | 47.131 | 7.47 | 1.51741 | 52.4 |
| 47 | −24.002 | 0.00 | | |

TABLE 4-continued

| # | R | D | $N_d$ | $v_d$ |
|---|---|---|---|---|
| 48 | ∞ | 33.00 | 1.60859 | 46.4 |
| 49 | ∞ | 13.20 | 1.51633 | 64.0 |
| 50 | ∞ | | | |

Table 5, below, lists the lens group spacings D18, D24, D26, and D29 at the wide-angle end, a mid-position and at the telephoto end. In addition, the focal distance f, the f number $F_{NO}$, and the image angle 2ω are listed for this embodiment.

TABLE 5

| | WIDE | MIDDLE | TELE |
|---|---|---|---|
| D18 | 1.63 | 46.72 | 67.91 |
| D24 | 3.66 | 3.46 | 3.25 |
| D26 | 65.09 | 14.93 | 7.35 |
| D29 | 10.05 | 15.32 | 1.92 | f = 7.57–147.7
$F_{NO}$ = 2.23–2.84
Image angle 2ω = 3.8°–75.8°

In this is embodiment, surface #19 (the object-side surface of lens element $L_{10}$, which forms part of the sub-assembly 2A of the second lens group), is aspherical. The surface shape is defined by equation (1) above, with the constants as given in Table 6 below.

TABLE 6

| # | C | K | $A_4$ | $A_6$ | $A_8$ | $A_{10}$ |
|---|---|---|---|---|---|---|
| 19 | 0.0238 | 1.0002600 | $0.8175288 \times 10^{-6}$ | $-0.2752142 \times 10^{-9}$ | $-0.3421095 \times 10^{-11}$ | $-0.6860909 \times 10^{-14}$ |

Embodiment 3

Table 7 lists the surface number # in order from the object side, the radius of curvature R (in mm) near the optical axis of each lens element surface, the on-axis surface spacing D, as well as the index of refraction $N_d$ and the Abbe value $v_d$ (at the d-line) for each lens element. Those surface with a * to the right of the surface number # are aspherical.

TABLE 7

| # | R | D | $N_d$ | $v_d$ |
|---|---|---|---|---|
| 1 | −9891.035 | 2.10 | 1.77250 | 49.6 |
| 2 | 82.616 | 18.87 | | |
| 3 | −247.087 | 1.90 | 1.77250 | 49.6 |
| 4 | 308.047 | 1.00 | | |
| 5 | 130.732 | 7.37 | 1.84665 | 23.8 |
| 6 | 859.752 | 1.48 | | |
| 7 | 342.859 | 7.16 | 1.43387 | 95.1 |
| 8 | −267.871 | 18.49 | | |
| 9 | 316.763 | 2.00 | 1.84665 | 23.8 |
| 10 | 94.020 | 0.43 | | |
| 11 | 98.616 | 13.84 | 1.59240 | 68.3 |
| 12 | −213.080 | 0.20 | | |
| 13 | 150.721 | 7.81 | 1.43387 | 95.1 |
| 14 | −771.668 | 0.20 | | |
| 15 | 113.010 | 8.40 | 1.43387 | 95.1 |
| 16 | 1458.430 | 0.20 | | |
| 17 | 79.258 | 6.71 | 1.59240 | 68.3 |
| 18 | 186.623 | D18 (variable) | | |
| 19* | 42.373 | 1.20 | 1.81600 | 46.6 |
| 20 | 17.792 | 3.44 | | |
| 21 | 60.645 | 1.94 | 1.81600 | 46.6 |
| 22 | 45.848 | 3.16 | | |
| 23 | −40.720 | 1.20 | 1.81600 | 46.6 |
| 24 | 26.205 | D24 (variable) | | |
| 25* | 33.557 | 3.57 | 1.84665 | 23.8 |
| 26 | −530.246 | D26 (variable) | | |
| 27 | −28.631 | 1.00 | 1.77250 | 49.5 |
| 28 | 49.413 | 2.57 | 1.80517 | 25.4 |
| 29 | −147.138 | D29 (variable) | | |
| 30 | ∞ (stop) | 2.16 | | |
| 31 | 119.230 | 4.55 | 1.53171 | 48.8 |
| 32 | −40.653 | 0.20 | | |
| 33 | 57.643 | 3.56 | 1.51680 | 64.2 |
| 34 | −209.636 | 0.30 | | |
| 35 | 42.879 | 6.04 | 1.49700 | 81.5 |
| 36 | −42.879 | 1.70 | 1.79951 | 42.2 |
| 37 | 52.199 | 1.00 | | |
| 38 | 120.122 | 4.07 | 1.51454 | 54.6 |
| 39 | −47.750 | 0.30 | | |

TABLE 7-continued

| # | R | D | $N_d$ | $v_d$ |
|---|---|---|---|---|
| 40 | 24.086 | 7.23 | 1.48749 | 70.2 |
| 41 | −47.920 | 1.50 | 1.83480 | 42.7 |
| 42 | 18.418 | 3.32 | | |
| 43 | 29.609 | 7.61 | 1.51680 | 64.2 |
| 44 | −21.472 | 1.50 | 1.81600 | 46.6 |
| 45 | 285.860 | 0.15 | | |
| 46 | 49.545 | 7.41 | 1.51741 | 52.4 |
| 47 | −23.902 | 0.00 | | |
| 48 | ∞ | 33.00 | 1.60859 | 46.4 |
| 49 | ∞ | 13.20 | 1.51633 | 64.0 |
| 50 | ∞ | | | |

Table 8, below, lists the lens group spacings D18, D24, D26, and D29 at the wide-angle end, a mid-position and at the telephoto end. In addition, the focal distance f, the f number $F_{NO}$, and the image angle 2ω are listed for this embodiment.

TABLE 8

| | WIDE | MIDDLE | TELE |
|---|---|---|---|
| D18 | 1.63 | 47.25 | 68.69 |
| D24 | 3.85 | 3.60 | 3.30 |
| D26 | 66.20 | 15.25 | 7.36 |
| D29 | 9.58 | 15.15 | 1.91 | f = 7.57–147.7
$F_{NO}$ = 2.26–2.82
Image angle 2ω = 3.6°–75.6°

As indicated in Table 7 above, surface #19 (the object-side surface of lens element $L_{10}$ in sub-assembly 2A) and surface #25 (the object-side surface of lens element $L_{13}$ in sub-assembly 2B) are aspherical. These surfaces are defined by equation (1) above with the constants as given in Table 9 below.

TABLE 9

| # | C | K | $A_4$ | $A_6$ | $A_8$ | $A_{10}$ |
|---|---|---|---|---|---|---|
| 19 | 0.0236 | 1.0049360 | $0.1995547 \times 10^{-5}$ | $0.2351656 \times 10^{-10}$ | $-0.3941929 \times 10^{-11}$ | $-0.8686622 \times 10^{-14}$ |
| 25 | 0.0298 | 0.9985030 | $-0.2099720 \times 10^{-5}$ | $0.8988572 \times 10^{-9}$ | $0.5141351 \times 10^{-12}$ | $-0.4965587 \times 10^{-15}$ |

Figure 4:
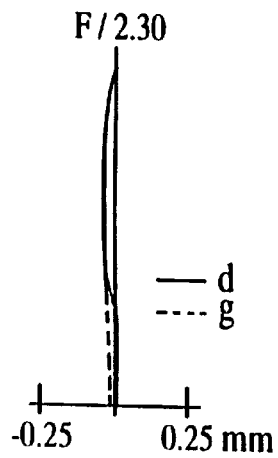
FIG. 4 shows the spherical aberration for the d and g lines, the astigmatism in the sagittal S and tangential T image planes, and the percent distortion at the wide-angle end (top row) and at the telephoto end (bottom row) for the zoom lens according to Embodiment 1 of the invention.
Figure 4:
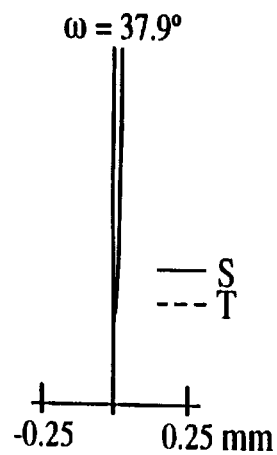
Figure 4:
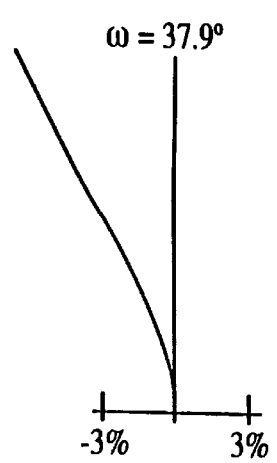
Figure 4:
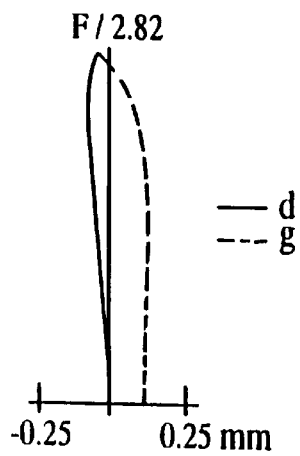
Figure 4:
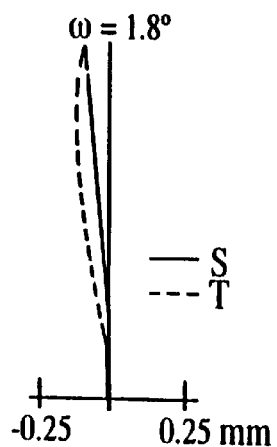
Figure 4:
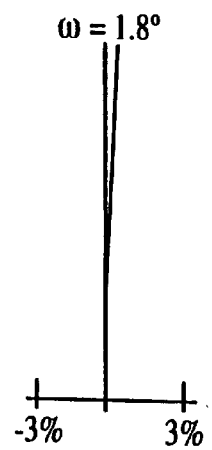
Figure 5:
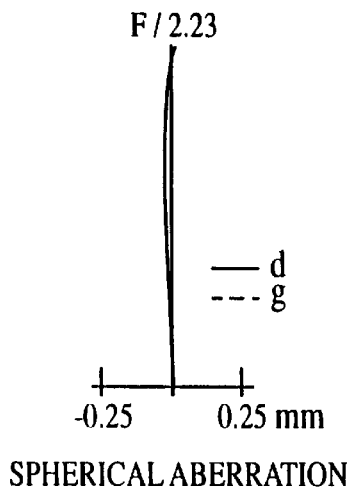
FIG. 5 shows the spherical aberration for the d and g lines, the astigmatism in the sagittal S and tangential T image planes, and the percent distortion at the wide-angle end (top row) and at the telephoto end (bottom row) for the zoom lens according to Embodiment 2 of the invention.
Figure 5:
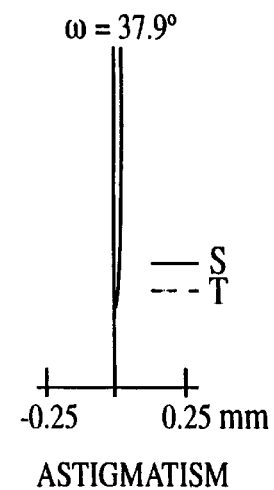
Figure 5:
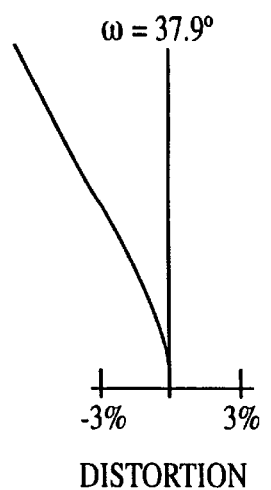
Figure 5:
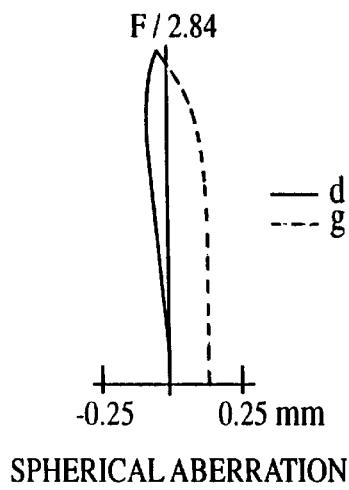
Figure 5:
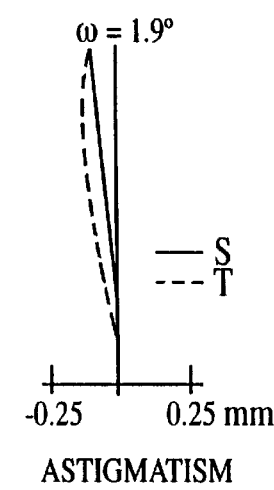
Figure 5:
Figure 6:
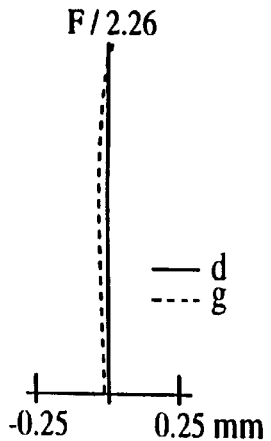
FIG. 6 shows the spherical aberration for the d and g lines, the astigmatism in the sagittal S and tangential T image planes, and the percent distortion at the wide-angle end (top row) and at the telephoto end (bottom row) for the zoom lens according to Embodiment 3 of the invention.
Figure 6:
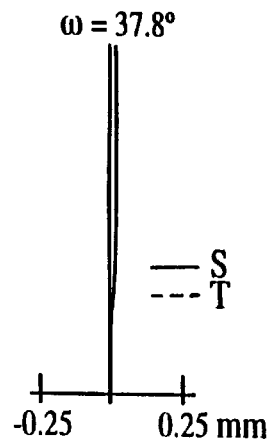
Figure 6:
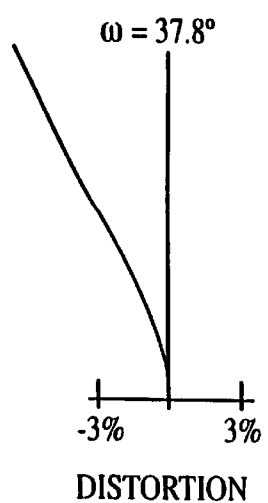
Figure 6:
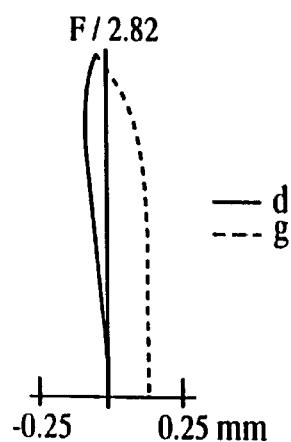
Figure 6:
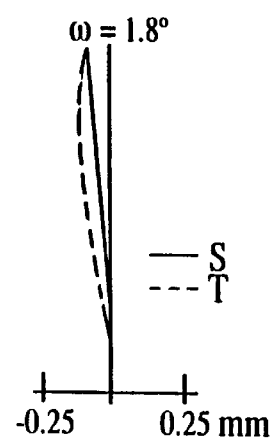
Figure 6:
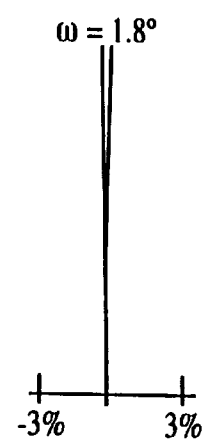
Figure 7:
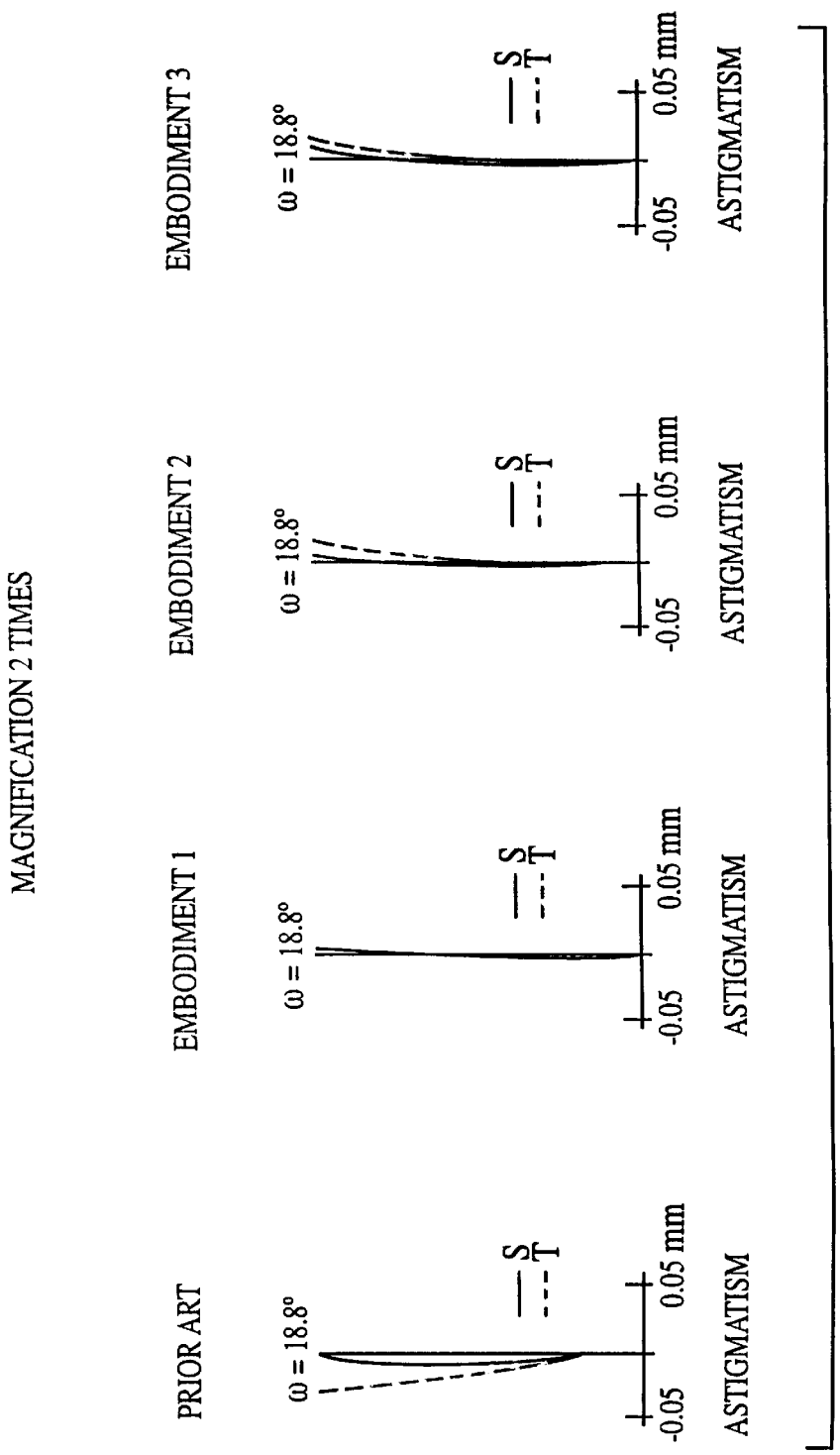
FIG. 7 shows the astigmatism in the sagittal S and the tangential T image planes associated with a conventional zoom lens (left) and with each of Embodiments 1–3 at magnification of 2X.
Figure 8:
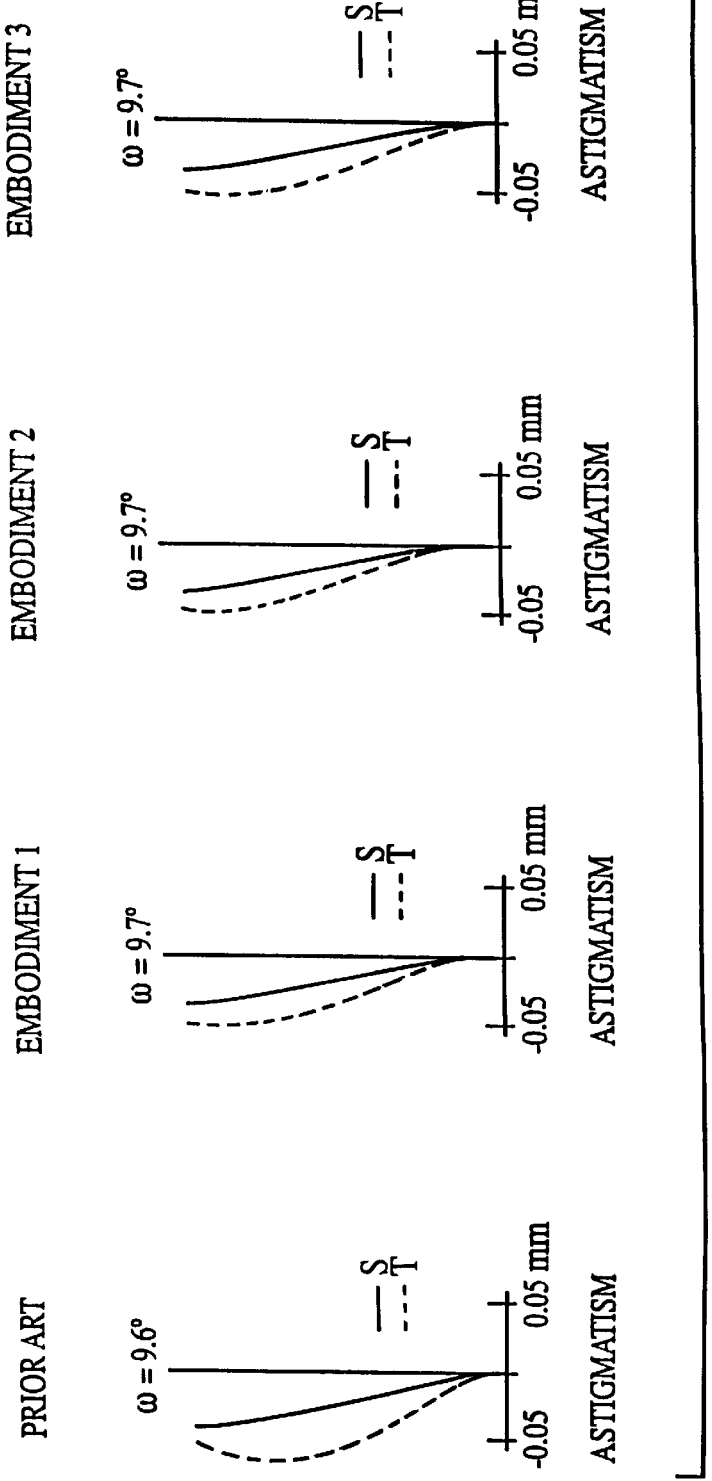
FIG. 8 shows the astigmatism in the sagittal S and the tangential T image planes associated with a conventional zoom lens (left) and with each of Embodiments 1–3 at magnification of 4X.

FIGS. 4–6 illustrate, for each of Embodiments 1–3, respectively, the spherical aberration, astigmatism, and distortion at the wide-angle end (top row) and the telephoto end (bottom row). FIGS. 7 and 8 are aberration figures which indicate the astigmatism in the tangential T and sagittal S image planes for a conventional lens, as well as for each of Embodiments 1–3. The magnifications for the conventional lens and Embodiments 1–3 are 2× for FIG. 7, and 4× for FIG. 8. As is apparent from these aberration figures, the zoom lens of the three embodiments is well-corrected for aberrations over the entire range of zooming, and astigmatism is notably improved.

As explained above, the zoom lens of the present invention separates the second lens group $G_2$ into two sub-assemblies, of negative and positive refractive power, in order from the object side, and the spacing between these subassemblies is varied with zooming in order to correct for aberration shifts. In addition, one or more of the surfaces of second lens group $G_2$ are made aspherical in order to balance aberrations, especially astigmatism, over the entire range of zoom. Using one or more aspherical surfaces in the second lens group $G_2$ is especially effective in improving optical performance of the zoom lens because it is the lens group wherein the ray heights and incident angles change the most during zooming. Thus, the design provides a compact and lightweight zoom lens having high quality imaging over the entire range of zoom.

The invention being thus described, it will be obvious that the same may be varied in many ways. For example, the number of lens elements in each lens group may be varied. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A zoom lens having only five lens groups of positive, negative, negative, positive and positive refractive power, respectively, in order from the object side, wherein:

the focal distance of the zoom lens is varied by shifting the second and third lens groups, in order from the object side, along the optical axis;

the first lens group, in order from the object side, is formed of three sub-assemblies, with the sub-assembly nearest the object side having negative refractive power and being fixed in position, the middle sub-assembly having positive refractive power and shifting along the optical axis in order to correct what otherwise would be a shifting in the image plane as the distance to the object is varied, and the sub-assembly nearest the image-side having positive refractive power and being fixed in position;

the second lens group, in order from the object side, is formed of two sub-assemblies, having negative and positive refractive power, respectively, and the spacing between these two sub-assemblies is varied with a change in focal distance in order to correct for aberrations.

2. The zoom lens as set forth in claim 1, wherein at least one surface in the second lens group is aspherical.

3. The zoom lens as set forth in claim 2, wherein at least two surfaces in the second lens group are aspherical.

* * * * *

UNITED STATES PATENT AND TRADEMARK OFFICE
CERTIFICATE OF CORRECTION

PATENT NO. : 6,278,559 B1
DATED : August 21, 2001
INVENTOR(S) : Yahagi

It is certified that error appears in the above-identified patent and that said Letters Patent is hereby corrected as shown below:

Column 1,
Line 29, change "Tile" to -- The --;

Column 3,
Line 51, delete the entire line and insert:
-- $Z = CY^2 / [1 + (1-KC^2Y^2)^{0.5}] + A_4Y^4 + A_6Y^6 + A_8Y^8 + A_{10}Y^{10}$ ...Equation (1) --;
Line 58, change "from optical" to -- from the optical --;

Column 4,
Line 18, change "R (In mm)" to -- R (in mm) --;

Column 5,
Line 29, change "equation (1)" to -- Equation (1) --;

Column 6,
Line 65, change "this is embodiment" to -- this embodiment --;

Column 7,
Line 1, change "equation (1)" to -- Equation (1) --;
Line 17, "surface" to -- surfaces --;

Column 9,
Lines 13, 19 and 22, change "$G_2$" to -- G2 --.

Signed and Sealed this

Twenty-sixth Day of March, 2002

*Attest:*

JAMES E. ROGAN
*Attesting Officer*     *Director of the United States Patent and Trademark Office*